(12) United States Patent
Bonanno (10) Patent No.: US 6,431,055 B2
(45) Date of Patent: Aug. 13, 2002

(54) AUTOMATIC UNIT FOR PREPARING ESPRESSO COFFEE

(75) Inventor: Francesco Bonanno, Gaggio Montano (IT)

(73) Assignee: Petroncini Impianti S.r.l., Modena (IT)

( * ) Notice: Subject to any disclaimer, the term of this patent is extended or adjusted under 35 U.S.C. 154(b) by 0 days.

(21) Appl. No.: 09/775,542

(22) Filed: Feb. 5, 2001

(30) Foreign Application Priority Data

Feb. 7, 2000 (IT) .................................. BO00A0053

(51) Int. Cl.[7] .................................. A47J 31/40
(52) U.S. Cl. ................. 99/302 P; 99/289 R; 99/295
(58) Field of Search ........................ 99/302 P, 302 R, 99/389 R, 295, 297

(56) References Cited

U.S. PATENT DOCUMENTS 4,852,472 A * 8/1989 In-Albon et al. ......... 99/289 R
5,275,089 A * 1/1994 Armellin .................. 99/289 R
5,755,149 A   5/1998 Blanc et al. .............. 99/289 T
6,079,315 A * 6/2000 Beaulieu et al. .......... 99/289 R

FOREIGN PATENT DOCUMENTS

EP          0887036          12/1998

* cited by examiner

Primary Examiner—Reginald L. Alexander
(74) Attorney, Agent, or Firm—Browdy and Neimark (57) ABSTRACT

Automatic espresso coffee dispensing unit includes a hot water delivery device (2) and, for containing coffee powder or a capsule, a compartment (47, 152) to be moved into sealed relationship against the delivery device, such compartment being in the form of a cylindrical jacket (73, 41) rigid with a movable hollow body (7, 40) which is sealedly mounted on a fixed hollow body (5, 50) to create a variable volume chamber connected via a two- or three-way valve alternatively to a pressurized water source and to discharge.

18 Claims, 7 Drawing Sheets

AUTOMATIC UNIT FOR PREPARING ESPRESSO COFFEE

This invention relates to a completely automatic unit for preparing espresso coffee, in which the various mutually moving parts are operated by the pressurized water delivered by the service pump, further electrical or pneumatic controls being absent.

The known art provides automatic espresso coffee dispensing units comprising mutually moving parts driven by electrical actuators controlled by sophisticated means, to ensure that the coffee powder is subjected to the correct pressure necessary to obtain a drink having the required quality.

Dispensing units of known type are complicated and costly, are difficult and onerous to maintain, and have to be installed by specialised personnel possessing the necessary equipment.

The main object of the invention is to provide an espresso coffee dispensing unit of simple and economical construction, installation and assembly, and which can be used without difference either in automatic machines for professional use, or in machines intended for domestic use.

A further object of the invention is to provide a coffee dispensing unit of the aforesaid characteristics, which can be used with loose ground coffee, or with sachets or capsules pre-filled with ground coffee.

A particular object of the invention is to provide a dispensing unit able to use those pre-filled sachets of coffee powder of the capsule type comprising a semi-rigid cup with a filtering base and top, and provided with a support collar.

The main object of the invention is attained by an automatic espresso coffee dispensing unit comprising hot water delivery means and, for containing coffee powder, a compartment to be moved into sealed relationship against said delivery means, said compartment being in the form of a cylindrical jacket rigid with a movable hollow body which is sealedly mounted on a fixed hollow body to create a variable volume chamber connected to the operating pump of the dispenser.

The remaining objects are all attained according to the invention by a dispenser having the characteristics stated in the claims.

The merits and constructional and operational characteristics of the invention will be apparent from the ensuing detailed description, which illustrates two preferred embodiments thereof with the aid of the figures of the accompanying drawings.

The dispensing unit 1 shown in FIGS. 1 to 4 comprises a normal hot water delivery means 2 from which two cylindrical rods 3 extend towards the right to support a fixed plate 4.

Figure 1:
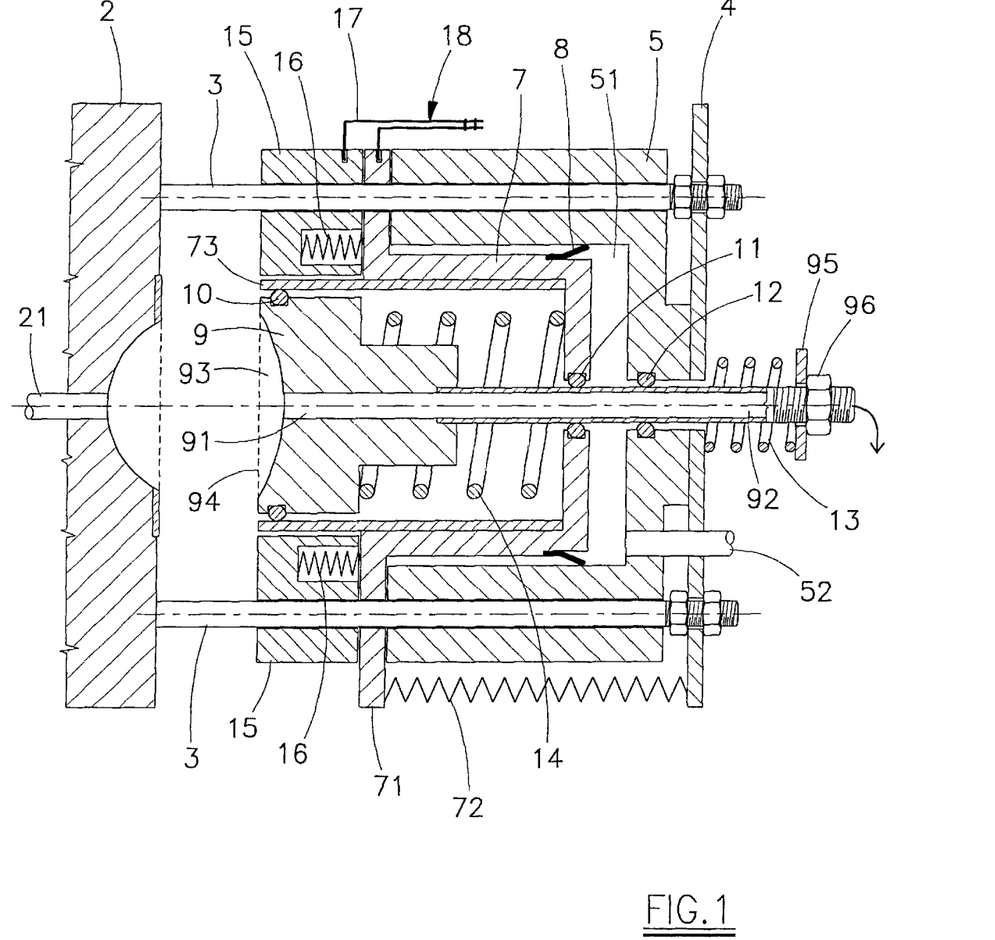
FIG. 1 is a horizontal section through a first embodiment of the invention in its rest position.

The rods 3 carry mounted thereon a fixed hollow body 5 provided with a cylindrical inner cavity 51 in which a movable hollow body or first hollow piston 7 slides in sealed relationship, or a first hollow piston 7 with interposed gasket 8.

Figure 8:
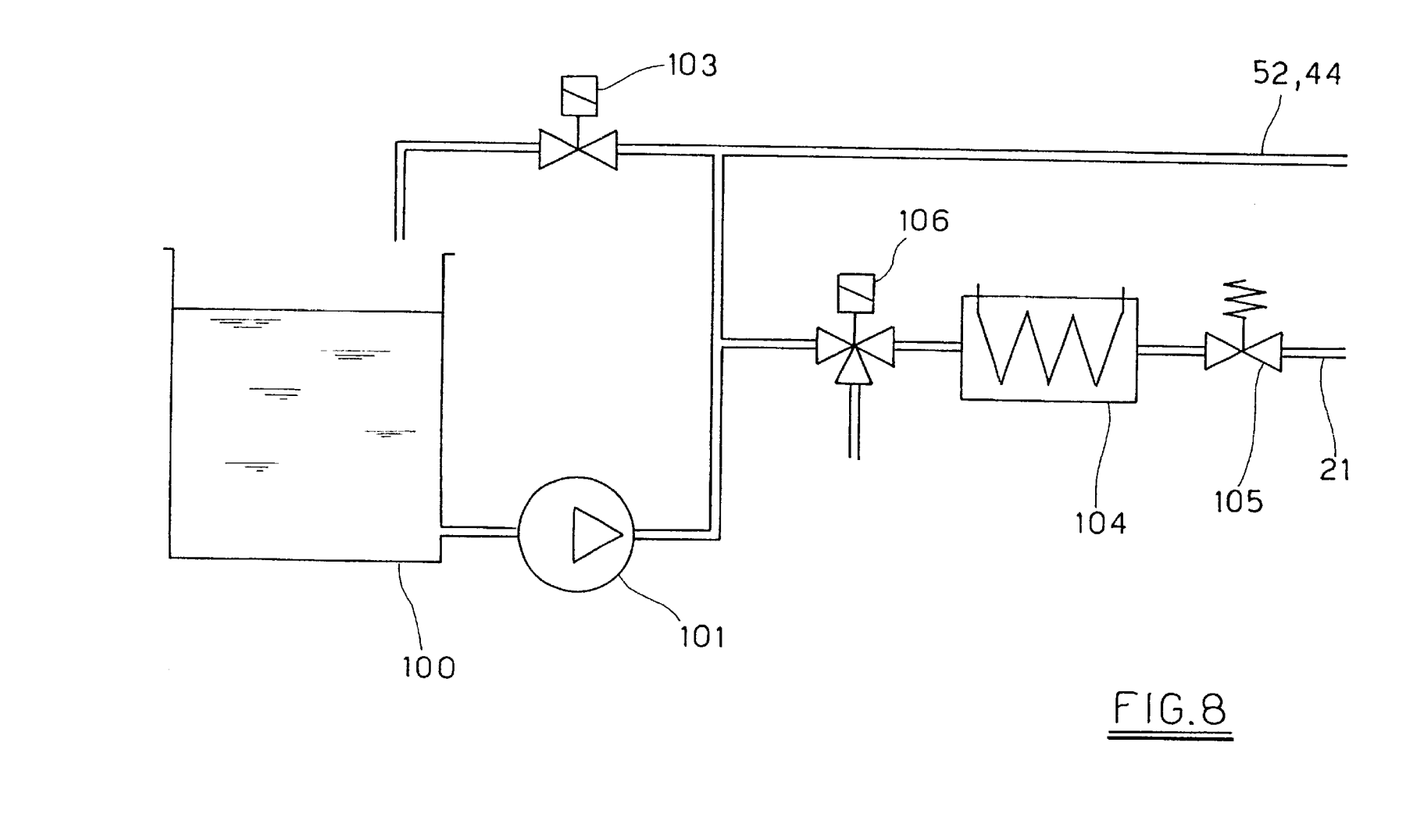
FIG. 8 shows a possible hydraulic circuit for the device.

From the base of the cylindrical cavity 51 their extends a conduit 52 connected to the pressurized water circuit (see FIG. 8).

The first hollow piston 7 presents at one end a flange 71 which is also mounted on the rods 3 and is connected to the plate 4 by a first spring 72 of tension type which maintains it resting on the body 5.

The first hollow piston or movable hollow body 7 carries upperly fixed thereto a cylindrical jacket 73 within which a second piston 9 slides by way of an interposed gasket 10.

The second piston 9 presents an axial conduit 91 which extends to the right into a tube 92 which sealedly passes through the base of the first hollow piston 7 and the base of the cylindrical cavity of the body 5 to reach beyond the plate 4; the gaskets 11 and 12 provide the seal.

The second piston 9 presents at its left end a depression 93, from the centre of which there extends said axial conduit 91, and which is closed by a perforated plate 94.

On the opposite end of the tube 92 there is mounted a disc 95 which acts as a support for a second spring 13 of compression type acting between said disc and the base of the body 5.

The disc 95 is slidable axially on the tube 91, which has its end externally threaded for a short distance, and is maintained in position by a nut 96 screwed onto the tube 91.

The springs 13 and 14 are compressed to a greater or lesser extent by screwing down the nut 98 to a greater or lesser degree.

A third spring 14 of compression type is positioned between the base of the second piston 9 and the base of the first hollow piston, to maintain the end of said the second piston at the level of the cylindrical jacket 73 as shown in FIG. 1.

The two rings 3 carry axially slidable thereon a hollow body 15 which has two cavities receiving a pair of fourth springs 16 of compression type, and has an axial dimensional such that its left end is flush with the cylindrical jacket 73.

An elastic pawl 17 is securely fixed to the flange 71 of the first hollow pistons 7, and is inserted elastically into a seat provided in the annular body 15.

Figure 4:
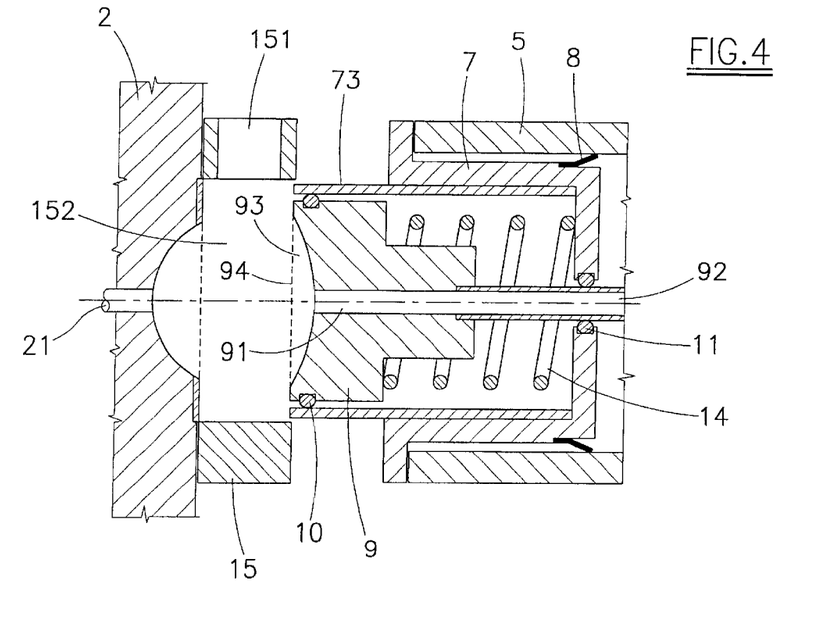
FIG. 4 is a section on the line IV—IV of FIG. 2.

The annular body 15 upperly presents a radial conduit 15 well visible in FIG. 4.

The aforedescribed unit is shown in its rest position in FIG. 1.

When it is desired to dispense espresso coffee, the elastic pawl 17 is pressed with one finger in the direction of the arrow 18, so releasing the annular body 15 from the flange 71 of the first hollow piston 7.

Figure 2:
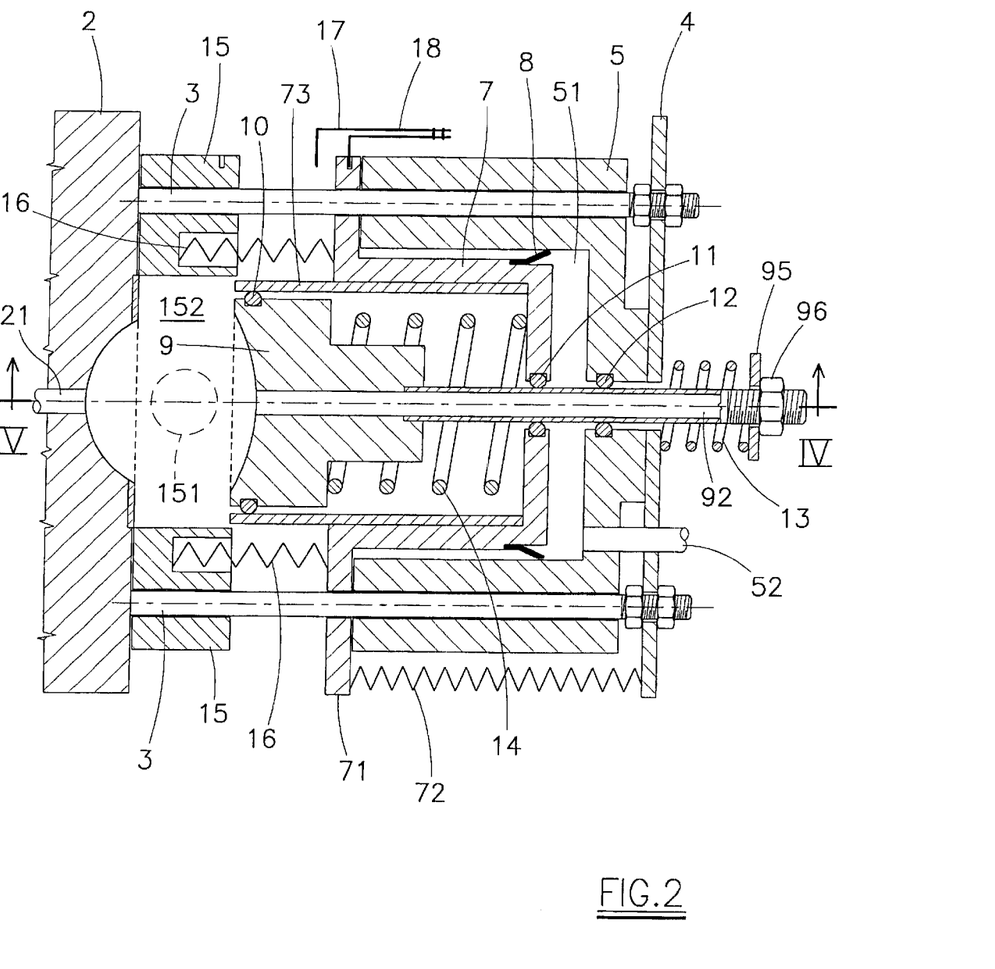
FIG. 2 shows this latter in its first operative phase.

By virtue of the thrust of the fourth springs 16, the annular body is moved into contact with the hot water delivery means 2, so creating a cylindrical compartment 152 into which coffee powder is fed via the conduit 151.

This position is shown in FIG. 2.

Figure 3:
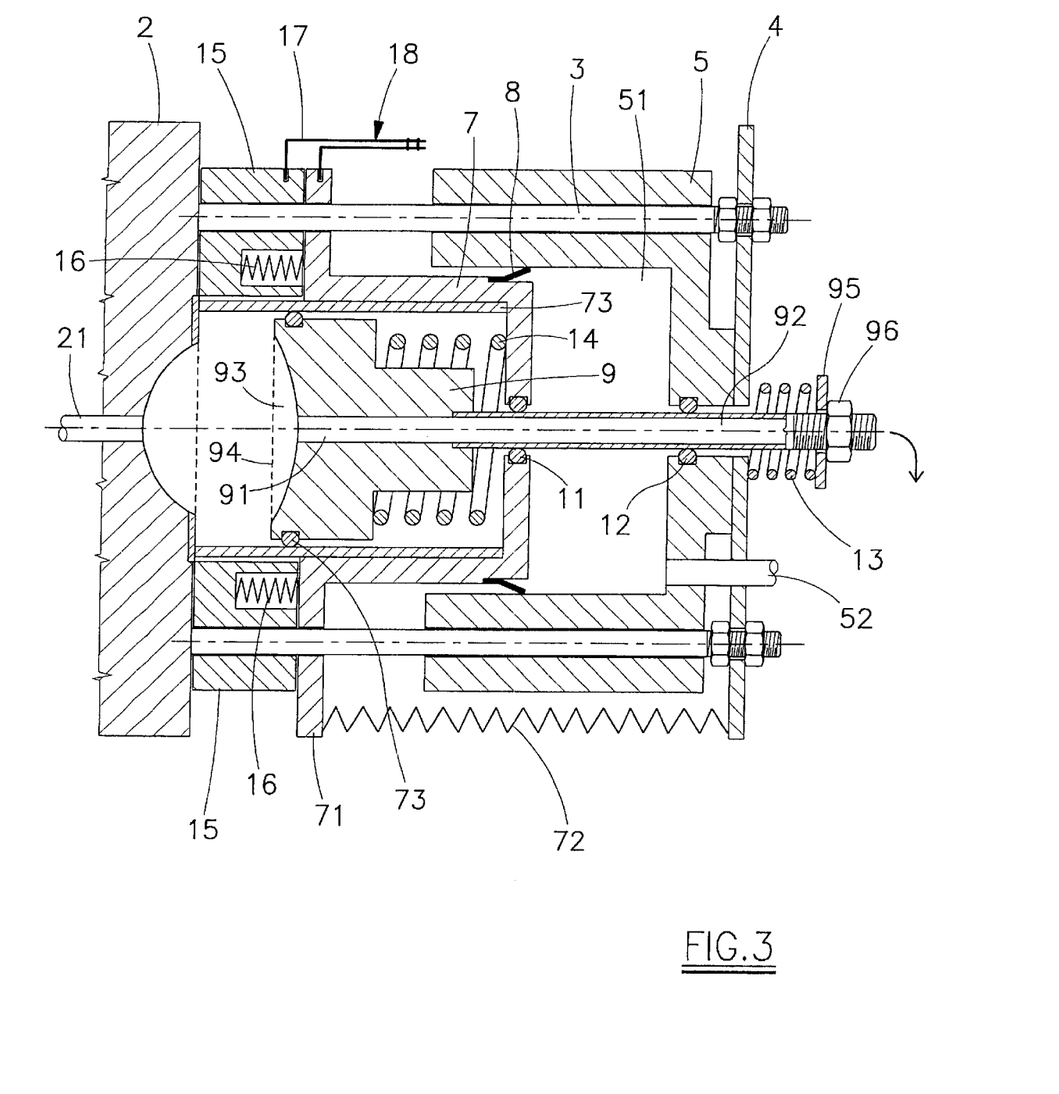
FIG. 3 shows this latter in its second operative phase.

When the ground coffee has been fed into said cylindrical compartment, the service pump and the two-way valve 103 are operated to feed pressurized water below the first hollow piston 7, this latter being displaced until the cylindrical jacket 73 makes sealed contact with the wall of the distributor 2 and the flange 71 makes contact with the annular body 15 to cause the pawl 17 to snap-operate and hook onto the annular body, as shown in FIG. 3.

The second piston 9 withdraws against the action of the third spring 14 to maintain the coffee conveniently pressed.

The unit is hence ready to dispense the coffee, which is achieved by opening a timed valve 106 (FIG. 8), to deliver hot water.

When delivery is complete the valve 106 returns to its initial position, to discharge the hot water lying within the circuit between it and the spring-loaded valve 105, then the valve 103 is again operated to return it into its initial position, and discharge the water acting against the first hollow piston, so enabling the first spring 72 to reposition this latter and the annular body coupled to it as shown in FIG. 1.

Figure 5:
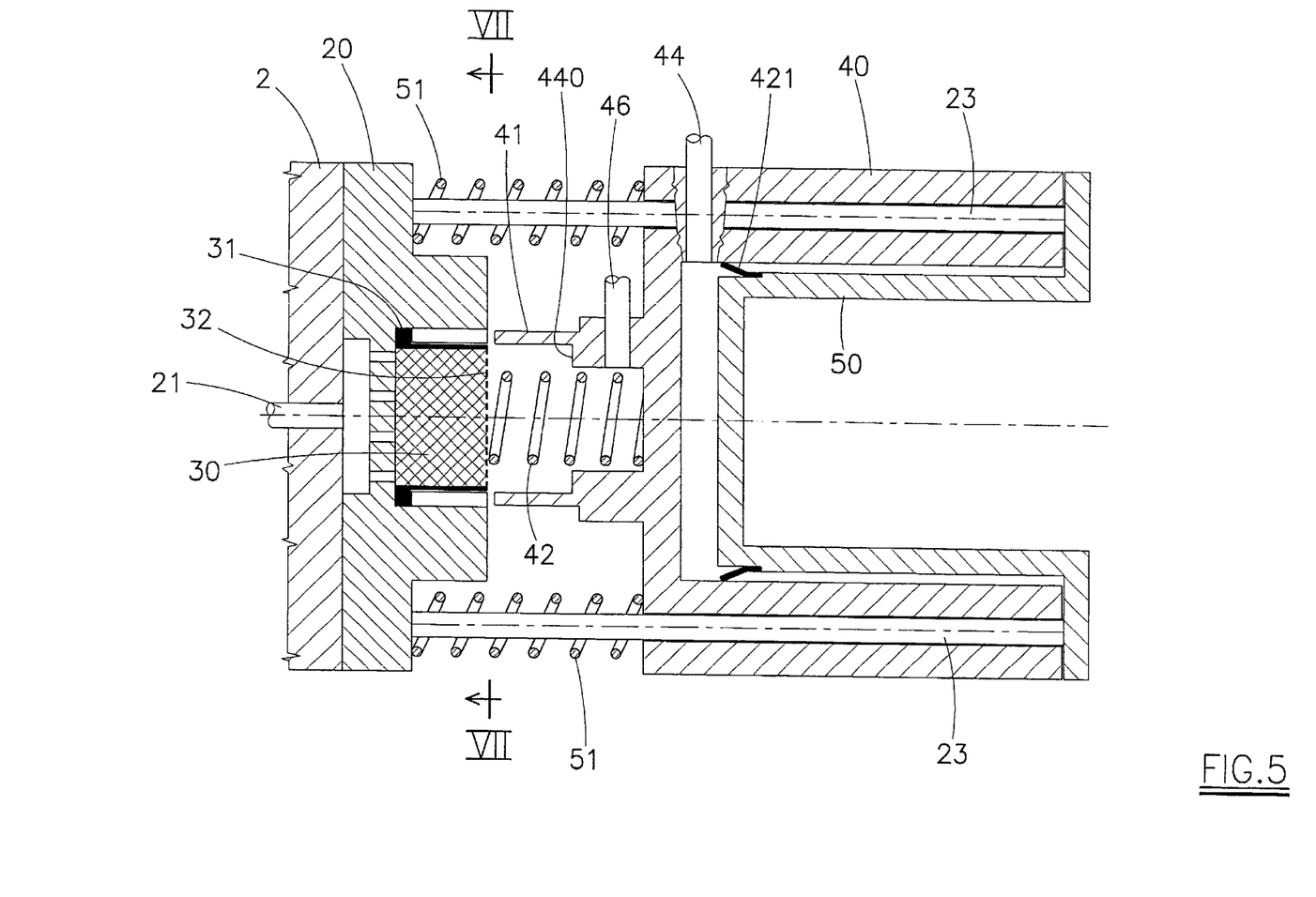
FIG. 5 is a horizontal section through a second embodiment of the invention in its rest position.
Figure 6:
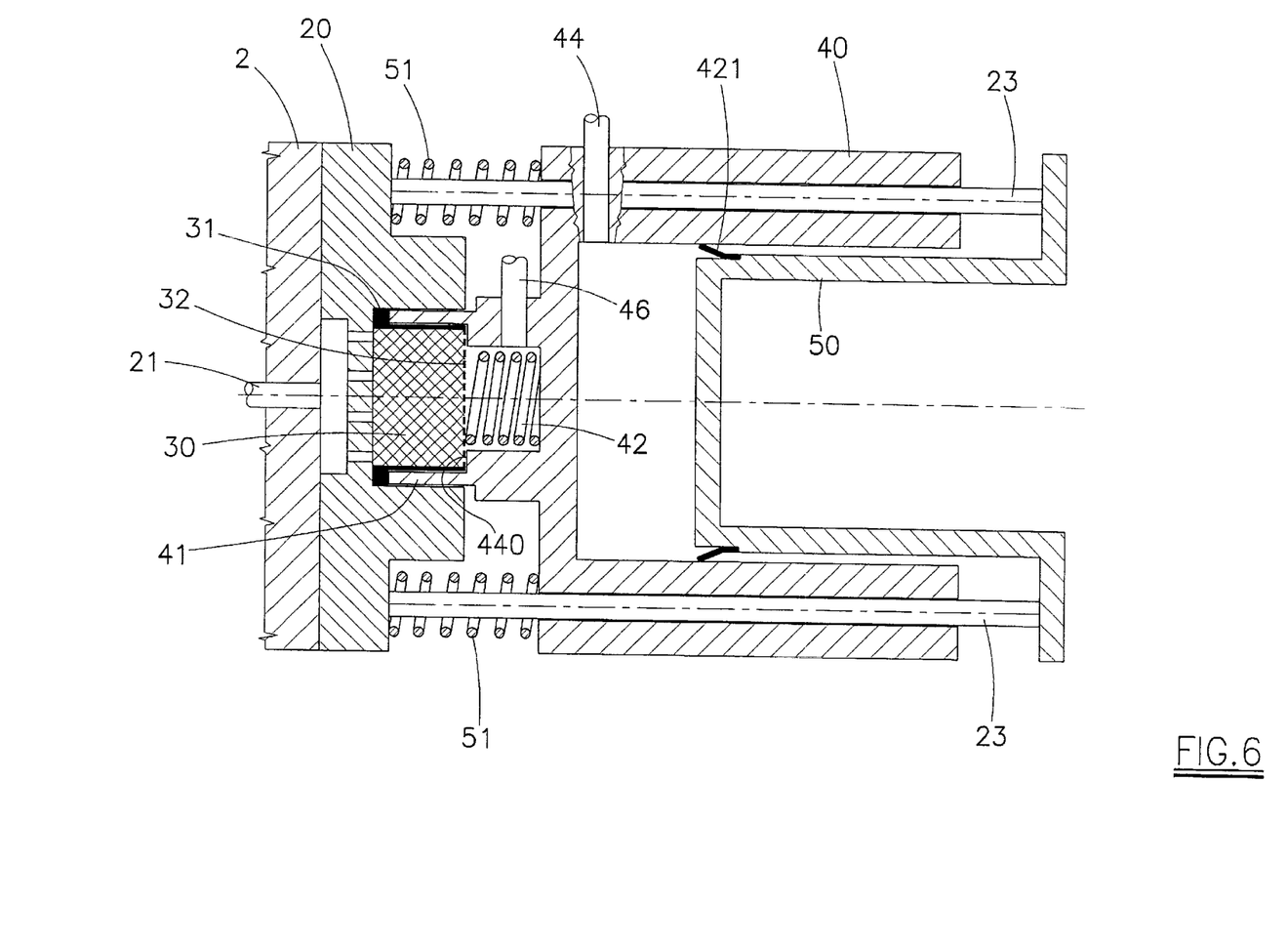
FIG. 6 shows this latter in an operative phase.
Figure 7:
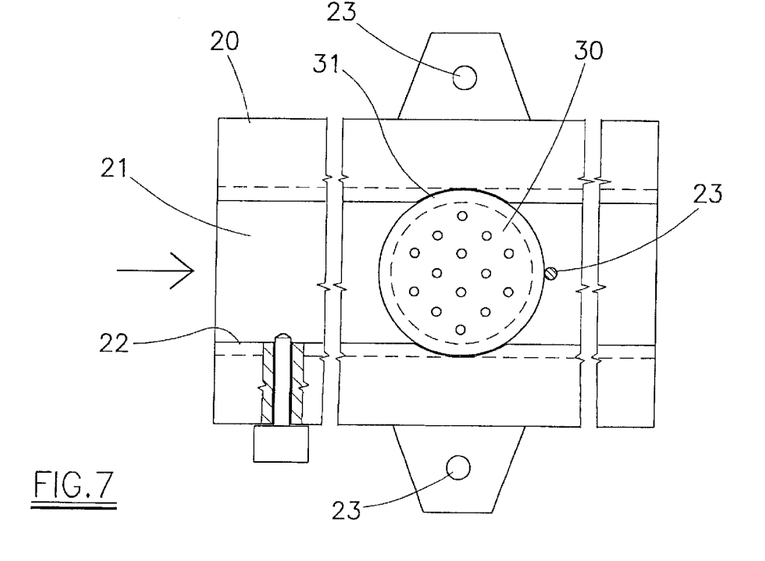
FIG. 7 is a section on the line VII—VII of FIG. 5.

With reference now to FIGS. 5 to 7, these show the hot water delivery means 2 with which there is associated a plate 20 provided with a central groove 21 the edges of which present two parallel projecting ribs 22 for supporting and guiding the upper rim 31 of a capsule 30 containing ground coffee.

Said ribs are interrupted at the position in which the capsule is axially aligned with a cylindrical jacket 41 which projects from a body 40 in the shape of an inverted cup corresponding to the hollow body 5 of FIG. 1 slightly modified.

This latter is sealedly mounted, via a gasket 42, on the outside of a fixed piston 50 which is joined to the plate 20 at a precise distance therefrom by two rods 23 on which the cup-shaped body 40 is slidingly mounted.

Two springs 51 mounted on the rods 23 maintain the cup-shaped body 40 against the fixed piston 50, as in FIG. 5.

The cylindrical jacket 41 contains a spring 42 which when in its rest position reaches flush with the outer edge of the jacket.

The interior of the cup-shaped body communicates with the pump 101 via a conduit 44.

The interior of the cylindrical jacket communicates with the outside via the conduit 46 through which the coffee is dispensed into a cup.

The second embodiment of the invention operates in the following manner.

When the dispensing unit is in its rest or standby position, it is configured as in FIG. 5. A capsule 30 is made to slide from the outside by falling along the ribs 22 until it lies coaxial with the jacket 41.

In this position the ribs are interrupted, and the capsule rests on the retractable pin 23 of FIG. 7.

Operation of the service pump 101 and valve 103 causes the cup-shaped body 40 to advance until the edge 440sealedly rests against the edge of the perforated base 32 of the capsule 30, pressing it in its turn sealedly against the plate 20, to attain the configuration of FIG. 6.

The retractable pin 23 is withdrawn electromagnetically when the jacket 41 supports the capsule.

Advancement of the body 40 simultaneously causes compression of the spring 40 against the perforated base 32 of the capsule 30.

After passing through the heater 104, hot water is delivered by means of the pump 101 and valve 106 for a predetermined time, it filtering through the capsule 30 to collect in the form of espresso coffee at the exit of the conduit 46.

When this delivery has ended, it is a sufficient to halt the pump and again switch firstly the valve 106 and then the valve 103, to discharge firstly the excess hot water then the water contained between the cup-shaped body 4 and the hollow piston 50, this enabling the springs 23 to return the cup-shaped body 4 into its initial position shown in FIG. 5.

Withdrawing the cup-shaped body 4 with the relative jacket 41 disternds the spring 42 which maintains the capsule 30 perfectly aligned with the ribs 22 along which its slides, to fall outside the system when completely released from the jacket 41 and no longer compressed by the spring 42.

Both the aforedescribed preferred embodiments are of horizontal axis, however it is apparent that with a few obvious modifications the device can also be constructed of vertical axis.

What is claimed is:

1. An automatic espresso coffee dispensing unit comprising hot water delivery means (2);

an annular body (15) axially movable in respect of said water delivery means;

a first hollow piston (7) axially movable in respect to said annular body, comprising a jacket (73) suitable to enter the central hole of said annular body;

the first hollow piston being provided by first elastic means (72) to maintain said first hollow piston in a position far from said water delivery means, and second elastic means (16) to maintain said first hollow piston in a position far from said annular body;

said jacket comprising a compartment (47) for containing coffee powder or a capsule, and being suitable to contact sealedly said delivery means;

said first hollow piston (7) being sealedly movable into the cavity of a fixed hollow body (5, 50) to create a variable volume chamber;

said chamber being connected via a two- or three-way valve alternately to a pressurized water source and to discharge;

a second piston being sealedly movable into said jacket by third elastic means;

said second piston comprising a perforated plate (94) communicating with the outside via a duct for draining brewed coffee, and a pawl (17) securely fixed to the first hollow piston and removably and elastically inserted into a seat provided in the annular body.

2. A unit as claimed in claim 1, characterized in that the base of the compartment (47) containing coffee powder consists of a perforated wall movable elastically in opposition to a spring.

3. A unit as claimed in claim 1, characterized in that the base of the compartment (152) containing coffee powder consists of a piston (9) presenting, for exit of the infused liquid, an axial conduit (91) extending into a tube (92) which sealedly passes through the base of the movable hollow body and the base of the fixed hollow body.

4. A unit as claimed in claim 1, characterized in that said movable hollow body (7, 40) is slidable on two rods (3, 23) which connect the fixed hollow body to the hot water delivery means, and is maintained in contact with the fixed hollow body by elastic means (72, 51).

5. A unit as claimed in claim 1, characterized in that between the movable hollow body and the hot water delivery means there is provided an annular body (15) which is mounted on the outside of said jacket (73) and can assume a withdrawn position in contact with said movable hollow body and an advanced position in contact with said delivery means.

6. A unit as claimed in claim 5, characterised in that between said annular body (15) and said movable hollow body (7) there are provided elastic means (16) arranged to advance the annular body into contact with the delivery means, and an elastic pawl (17) arranged to maintain the annular body in contact with the hollow body.

7. A unit as claimed in claim 5, characterised in that said annular body (15) presents a substantially radial conduit (151) through which loose coffee powder is introduced.

8. A unit as claimed in claim 5, characterised in that said annular body (15) is slidingly mounted on the rods (3) which connect the hot water delivery means (2) to the fixed hollow body (5).

9. A unit as claimed in claim 1, characterized in that between the hot water delivery means (2) and the movable hollow body (40) there is provided a plate (20) possessing a channel (21) with internally projecting ribs (22) for guiding the rim of a cup capsule (30) containing coffee powder.

10. A unit as claimed in claim 8, characterised in that said plate (20) is securely fixed to the hot water delivery means (2).

11. A unit as claimed in claim 8, characterised in that said support ribs (22) are interrupted in that portion overlying said jacket (41).

12. A unit as claimed in claim 1 in which the second piston is a capsule.

13. An automatic espresso coffee dispensing unit comprising:

hot water delivery means (2);

an annular body (15) axially movable in respect of said water delivery means;

a first hollow piston (7) axially movable in respect to said annular body, comprising a jacket (73) suitable to enter the central hole of said annular body;

the first hollow piston being provided by first elastic means (72) to maintain said first hollow piston in a position far from said water delivery means, and second elastic means (16) to maintain said first hollow piston in a position far from said annular body;

said jacket comprising a compartment (47) for containing a capsule, and being suitable to contact sealedly said delivery means;

said first hollow piston (40) being sealedly movable in respect of a fixed hollow body (50) to create a variable volume chamber;

said chamber being connected via a two- or three-way valve alternately to a pressurized water source and to discharge;

said first hollow piston comprising a duct communicating with the outside for draining brewed coffee.

14. A unit as claimed in claim 13, characterized in that said movable hollow body (7, 40) and said annular body (15) are slidable on two rods (3, 23) which connect the fixed hollow body to the hot water delivery means.

15. A unit as claimed in claim 13, characterized in that said annular body (15) presents a substantially radial conduit (151) through which loose coffee powder is introduced.

16. A unit as claimed in claim 13, in which said annular body is a plate (20) possessing a channel (21) with internally projecting ribs (22) for guiding the rim of a capsule (30) containing coffee powder.

17. A unit as claimed in claim 16 in which said plate (20) is securely fixed to the hot water delivery means (2).

18. A unit as claimed in claim 17, in which said support ribs (22) are interrupted in that portion overlying said jacket (41).

* * * * *